US012756720B2

(12) United States Patent
Griffin et al.

(10) Patent No.: US 12,756,720 B2
(45) Date of Patent: Oct. 6, 2026

(54) MIGRATING REPLICATED SECRETS FROM A CLOUD ENVIRONMENT TO A LOCAL SYSTEM

(71) Applicant: Red Hat, Inc., Raleigh, NC (US)

(72) Inventors: Leigh Griffin, Waterford (IE); Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 71 days.

(21) Appl. No.: 19/026,127

(22) Filed: Jan. 16, 2025

(65) Prior Publication Data

US 2026/0205465 A1 Jul. 16, 2026

(51) Int. Cl.
*H04L 9/40* (2022.01)

(52) U.S. Cl.
CPC ........ *H04L 63/105* (2013.01); *H04L 63/0428* (2013.01)

(58) Field of Classification Search
CPC .......................... H04L 63/105; H04L 63/0428
See application file for complete search history.

(56) References Cited

U.S. PATENT DOCUMENTS 9,703,965 B1 * 7/2017 Robinson ................ H04L 9/085
2019/0349426 A1 * 11/2019 Smith ................... H04L 63/123
2024/0223362 A1 * 7/2024 Barella .................. H04L 9/088
2025/0165407 A1 * 5/2025 Huang ................ G06F 12/1408
2025/0310086 A1 * 10/2025 Chattopadhyay ..... H04L 9/0825

* cited by examiner

*Primary Examiner* — Cheng-Feng Huang
(74) *Attorney, Agent, or Firm* — Kilpatrick Townsend & Stockton LLP

(57) ABSTRACT

Replicated secrets can be migrated from a cloud environment to a local system. For example, a system can receive a secret stored in a first geographic region and a second geographic region of a cloud environment. The system can determine a first security level associated with a first source location of the secret and a second security level associated with a second source location of the secret. The system can encrypt the secret using a first encryption key associated with the first security level to generate a first encrypted secret. The system can determine that a first filesystem in a physical server corresponds to the first source location of the secret and store the first encrypted secret in the first filesystem of the physical server. The first encrypted secret can be usable to control access of one or more protected computing resources.

20 Claims, 3 Drawing Sheets

MIGRATING REPLICATED SECRETS FROM A CLOUD ENVIRONMENT TO A LOCAL SYSTEM

TECHNICAL FIELD

The present disclosure relates generally to secrets management. More specifically, but not by way of limitation, this disclosure relates to migrating replicated secrets from a cloud environment to a local system.

BACKGROUND

Secrets are non-human privileged credentials used in computing systems to control access to protected computing resources or sensitive information, (e.g., personally identifiable information). Examples of secrets include account credentials, passwords, and application programming interface (API) keys. To prevent malicious actors from accessing the secrets, secrets are often managed using a secret manager that stores the secrets in a central location (e.g., a cloud environment) and controls permissions to access the secrets. Components (e.g., an automation tool) of a computing system can communicate with the secret manager to obtain a secret as authentication to access the protected computing resources.

DETAILED DESCRIPTION

Figure 1:
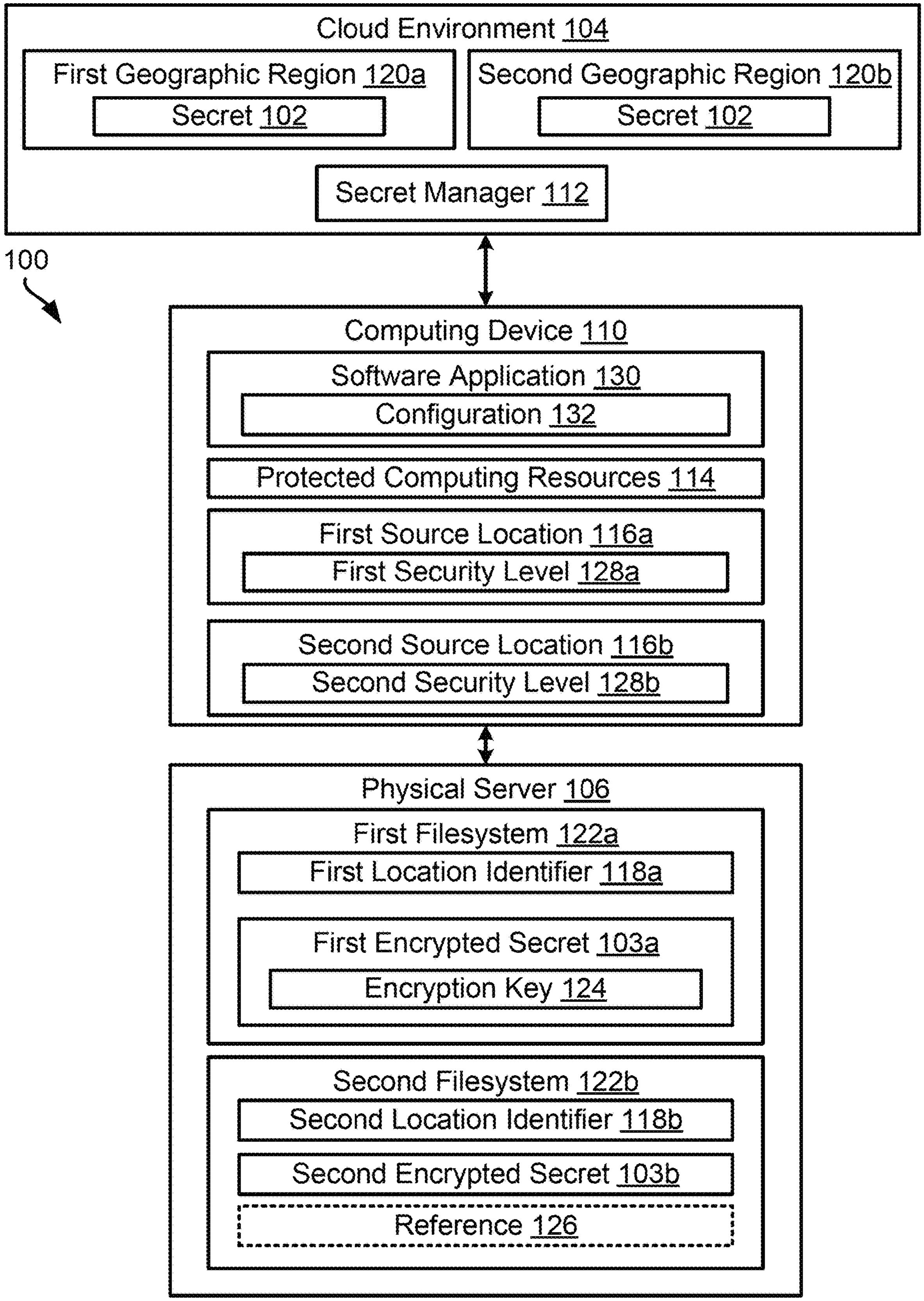
FIG. 1 is a block diagram of an example of a computing environment for migrating replicated secrets from a cloud environment to a local system according to one example of the present disclosure.

Cloud computing can enable flexibility in device and location with respect to accessing computing resources. But, using cloud environments can introduce security risks, for example when configuration management is controlled by multiple users. A misconfigured cloud environment with public write access can result in data loss or security breaches by malicious actors. Some jurisdictions have passed laws or regulations requiring users to store sensitive information (e.g., biometric data, passwords, or personally identifying information) in certain ways that improve security and privacy protections. Accordingly, the users may implement reverse cloud migration or cloud repatriation to move away from using the cloud environments to instead use on-premise infrastructure. But, to avoid vendor lock-in caused by using a sole cloud provider, the users may have employed a hybrid cloud environment that uses infrastructure from multiple cloud providers. Migrating away from the hybrid cloud environment to improve privacy protections can be complicated by merging the multiple cloud providers in the on-premise infrastructure, for example with respect to preserving topology of the cloud ecosystem.

Some examples of the present disclosure can overcome one or more of the issues mentioned above by migrating replicated secrets from cloud environments to a local system such that the secrets are stored in an on-premise computing environment, such as a physical server. The secrets can include digital authentication credentials (e.g., passwords, tokens, certificates, etc.) used to control access to one or more protected computing resources. Using the on-premise computing environment can afford greater security protection compared to using a cloud environment, enabling a user to comply with privacy protections implemented according to a respective jurisdiction associated with the secrets. For example, the on-premise computing environment may have consolidated management or predefined security parameters to enable relatively higher data privacy protections.

Migrating the replicated secrets from the cloud environments to the on-premise computing environment can involve a system receiving, from a secret manager associated with a cloud environment, a secret stored in a first geographic region and a second geographic region of the cloud environment. The system can determine a first security level associated with a first source location of the secret and a second security level associated with a second source location of the secret. The first source location can be associated with the first geographic region and the second source location can be associated with the second geographic region. The system can encrypt the secret using a first encryption key associated with the first security level to generate a first encrypted secret. The system can determine that a first filesystem in a physical server corresponds to the first source location of the secret and store the first encrypted secret in the first filesystem of the physical server. The first encrypted secret can be usable to control access of one or more protected computing resources. By migrating the encrypted secrets into the filesystems, computing infrastructure of the on-premise computing environment can replicate topology of the cloud environments. For example, storing the secrets in the on-premise computing environment can replicate logical and physical separation of services and data in the cloud environments. Once the secrets are migrated to the on-premise computing environment, the secrets stored in the cloud environments may be removed to conserve computing resources, such as memory space.

In one particular example, a computing device, such as a physical server, coupled to a cloud environment can receive a secret of a token from a secret manager associated with the cloud environment. The token can be stored in a first geographic region corresponding to the European Union (EU) and in a second geographic region corresponding to North America. Data privacy protections may vary depending on the originating geographic location of the token. For example, the General Data Protection Regulation (GDPR) regulates data protection and privacy for countries in the EU. So, the physical server can determine that the EU is associated with a higher security level than North America. The physical server can encrypt the token using at least a cryptographic algorithm associated with the higher security level of the EU to generate a first encrypted secret. The physical server may also encrypt the token using a cryptographic algorithm associated with the security level of North America to generate a second encrypted secret. Using location identifiers mapping to source locations of the token, the computing device can determine that a filesystem corresponding to the location identifier for the EU exists in the physical server. In some examples, the location identifier can be a shorthand designation or an acronym corresponding to a geographical region. For example, if the originating geographic location of the token is a country in the EU, the location identifier for the filesystem may be "EMEA" that is shorthand for Europe, the Middle East, and Africa. The physical sever stores the first encrypted secret in the EMEA filesystem. The physical server can also store the second encrypted secret or a reference to the first encrypted secret in a filesystem associated with North America. The multiple filesystems in the physical server can organize the encrypted secrets to reflect topology of the cloud environment while fulfilling a cryptographic requirement for each geographic location associated with the secret.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for migrating replicated secrets from a cloud environment 104 to a local system according to one example of the present disclosure. The local system can be an on-premise computing system with a physical server 106 to store encrypted secrets 103*a-b*. Components within the computing environment 100 may be communicatively coupled via a network, such as a local area network (LAN), wide area network (WAN), the Internet, or any combination thereof. For example, the computing environment 100 can include a computing device 110 communicatively coupled to a cloud environment 104 through the network.

A secret 102 may be stored in one or more buckets in the cloud environment 104, enabling organization and access control with respect to the secret 102. The computing device 110 additionally may be communicatively coupled to the physical server 106, enabling the computing device 110 to migrate the secret 102 from the cloud environment 104 to the physical server 106. In some examples, the computing device 110 may be the physical server 106. Additionally or alternatively, the computing device 110 may communicate with a different physical server using the network to migrate the secret 102. Examples of cloud providers that host the cloud environment 104 can include Amazon Web Services (AWS), Microsoft Azure, International Business Machines Corporation (IBM). The computing device 110 may be in communication with multiple cloud environments via the network, where secrets can be migrated from each cloud environment. Each cloud environment can include a respective secret manager. For example, the cloud environment 104 includes secret manager 112.

In general, the computing device 110 can receive the secret 102 stored in the cloud environment 104*a* from the secret manager 112. For example, the computing device 110 can receive a first indication of the secret 102 being stored in a first geographic region 120*a* of the cloud environment 104 from the secret manager 112. In addition, the computing device 110 can receive a second indication of the secret 102 being stored in a second geographic region 120*b* of the cloud environment 104 from the secret manager 112. Because the secret 102 is stored in multiple geographic regions, the secret 102 can considered to be replicated in the cloud environment 104. Examples of the secret 102 can include access credentials, API keys, or other suitable sensitive information controlling access to one or more protected computing resources 114. The access credentials may include database credentials, resource credentials, application credentials, etc.

Once the computing device 110 receives the secret 102, the computing device 110 can identify source locations of the secret 102. For example, the computing device 110 can determine a first source location 116*a* and a second source location 116*b* associated with the secret 102. In some examples, the first source location 116*a* and the second source location 116*b* can correspond to geographic bucket locations of buckets storing the secret 102 in the cloud environment 104. The geographic bucket locations can be assigned to the buckets upon creating the buckets in the cloud environment 104 and may correspond to a city, state, province, country, or other suitable geographic region. Additionally, the geographic bucket locations may be logical abstractions of physical resources provided in one or more physical data centers associated with a cloud provider of the cloud environment 104.

Based on the source locations 116, the computing device 110 can determine location identifiers 118 that map to the source locations 116. For example, the computing device 110 can perform a lookup of a lookup table to determine the location identifiers 118 that corresponds to the source locations 116. The location identifiers 118 can represent the geographic regions 120 that include the source locations 116 of the secret 102. That is, the first location identifier 118*a* can represent the first geographic region 120*a* that includes the first source location 116*a* of the secret 102 and the second location identifier 118*b* can represent the second geographic region 120*b* that includes the second source location 116*b* of the secret 102.

Once the computing device 110 determines the location identifiers 118, the computing device 110 can determine whether filesystems 122 corresponding to the location identifiers 118 exists in the physical server 106. The filesystems 122 may be physical filesystems associated with hardware of the computing device 110. Additionally or alternatively, the filesystems 122 may include virtual filesystem positioned as an abstract layer on top of a physical filesystem. If the filesystems 122 are already present in the physical server 106, the computing device 110 can store encrypted secrets 203 in the filesystems 122. That is, the computing device 110 can store first encrypted secret 103*a* in the first filesystem 122*a* and second encrypted secret 103*b* in the second filesystem 122*b*. The first encrypted secret 103*a* and the second encrypted secret 103*b* are generated based on the secret 102. Alternatively, if the computing device 110 determines that the physical server 106 lacks one or more of the filesystems 122 corresponding to the location identifiers 118, the computing device 110 can generate the missing filesystems 122 in the physical server 106. For example, if the computing device 110 determines that the physical server 106 includes the first filesystem 122*a* corresponding to the first location identifier 118*a*, but lacks the second filesystem 122*b* corresponding to the second location identifier 118*b*, the computing device 110 can generate the second filesystem 122*b* in the physical server 106. The computing device 110 then can store the second encrypted secret 103*b* in the generated second filesystem 122*b*. Including multiple filesystems in the physical server 106 can organize the encrypted secrets stored in the physical server 106 to reflect topology of the cloud environment 104 while fulfilling a cryptographic requirement for each secret based on the location identifier 118.

In some examples, the computing device 110 may identify a cryptographic key (e.g., an encryption key 124) or another suitable cryptographic method used to encrypt the secret 102 stored in the geographic regions 120. The encryption key 124 may be a symmetric encryption key or an asymmetric encryption key. If the encryption key 124 involves asymmetric encryption, a pair of cryptographic keys can be generated such that a first cryptographic key (e.g., a public key) can be used to encrypt the secret 102. A second cryptographic key (e.g., a private key) can be used to decrypt the encrypted secret. In some examples, the computing device 110 can use the same encryption key used to encrypt the secret 102 in the cloud environment 104 to encrypt the secret 102 stored in the physical server 106.

In some examples, the computing device 110 may determine the encryption key 124 to encrypt the secret 102 when stored in the physical server 106 based on the source locations 116 of the secret 102. For example, the first source location 116*a* corresponding to the first geographic region 120*a* may be associated with a first security level 128*a*. The first security level 128*a* can correspond to a cryptographic requirement associated with the first source location 116*a*. The cryptographic requirement may correspond to data privacy regulations associated with the first source location 116*a*. For example, a jurisdiction may require the secret 102 to be encrypted prior to data processing, for example to enable relatively higher security for personal data (e.g., name, network or physical address, etc.) accessible using the secret 102. As an illustrative example, the secret 102 may be a database credential used to access a database storing personal identification numbers. Encrypting the database credential prior to storing in the physical server 106 can enable relatively higher data security to protect the personal identification numbers. Once the computing device 110 identifies the first security level 128*a*, the computing device 110 can encrypt the secret 102 using the encryption key 124 to generate the first encrypted secret 103*a*, thus fulfilling the cryptographic requirement for the first source location 116*a*. The computing device 110 can store the first encrypted secret 103*a* in the first filesystem 122*a*.

The computing device 110 may similarly determine an encryption key to encrypt the secret 102 when stored in the second filesystem 122*b* based on the second source location 116*b*. For example, the second source location 116*b* corresponding to the second geographic region 120*b* may be associated with a second security level 128*b*. The second security level 128*b* can correspond to a cryptographic requirement associated with the second source location 116*b*. Once the computing device 110 identifies the second security level 128*b*, the computing device 110 can encrypt the secret 102 using the encryption key to generate the second encrypted secret 103*b*, thus fulfilling the cryptographic requirement for the second source location 116*b*. The computing device 110 can store the second encrypted secret 103*b* in the second filesystem 122*b*.

The second security level 128*b* may be higher or lower than the first security level 128*a* associated with the first source location 116*a*. The second security level 128*b* being higher than the first security level 128*a* means that the cryptographic requirement is more strict for the second encrypted secret 103*b*, resulting in the second encrypted secret 103*b* being more secure than the first encrypted secret 103*a*. In contract, the second security level 128*b* being lower than the first security level 128*a* means that the cryptographic requirement is less strict for the second encrypted secret 103*b*, resulting in the second encrypted secret 103*b* being less secure than the first encrypted secret 103*a*.

In some examples, the computing device 110 may use only one encryption key to generate the first encrypted secret 103*a* and the second encrypted secret 103*a*. For example, the computing device 110 may determine which of the source locations 116 is associated with a higher security level 128 and use the encryption key associated with that source location to generate the first encrypted secret 103*a* and the second encrypted secret 103*b*. As a particular example, the computing device 110 may determine that the first security level 128*a* is higher than the second security level 128*b*. So, the computing device 110 can encrypt the secret 102 using the encryption key 124 associated with the first security level 128*a* to generate the first encrypted secret 128*a* and the second encrypted secret 128*a*. The computing device 110 can then store this same encrypted key in the first filesystem 122*a* and the second filesystem 122*b*. In this way, the secret 102 can be encrypted to a same security level across all filesystems in the physical server 106. As a result, the secret 102 may not be more easily accessible in the physical server 106 than the highest security level associated with any of the geographic regions 120.

In some examples, rather than storing the first encrypted secret 103*a* in the first filesystem 122*a* and the second encrypted secret 103*b* in the second filesystem 122*b*, the computing device 110 may only store one copy of the encrypted secret. From the filesystems 122 associated with the secret 102, the computing device 110 may select a filesystem for storing the encrypted secret. For example, the computing device 110 may select a filesystem with a name that is alphabetically first, or according to another selection criteria. Upon selecting the filesystem, the computing device 110 can generate an encrypted secret by encrypting the secret 102 either using the encryption key associated with the source location corresponding to the selected filesystem or using the encryption key associated with the highest security level of the source locations associated with the secret 102. The computing device 110 can store the encrypted secret in the selected filesystem. In addition, the computing device 110 can store a reference to the encrypted secret in the other filesystems. In this way, the encrypted secret is deduplicated across the physical server 106, reducing resource usage associated with storing multiple copies of an encrypted secret.

As a particular example, the computing device 110 can select the first filesystem 122*a* for storing the first encrypted secret 103*a* associated with the secret 102 from the first geographic region 120*a* and the second geographic region 120*b*. The computing device 110 can generate the first encrypted secret 103*a* by encrypting the secret 102 using the encryption key 124 associated with the first source location 116*a*. The computing device 110 can then store the first encrypted secret 103*a* in the first filesystem 122*a*. In addition, the computing device 110 can store a reference 126 to the first encrypted secret in the second filesystem 122*b*.

A software application 130 may use the secret 102 to access the protected computing resources 114. Specifically, the software application 130 can include code in source code of the software application 130 to retrieve the secret 102, for example using the secret manager 112 or the computing device 110. The code can provide an address (e.g., a uniform resource locator (URL), Internet Protocol (IP) address, etc.) that the software application 130 uses to locate the secret 102. Additionally, the software application 130 may include a decryption key corresponding to the cryptographic key used to encrypt the secret 102. Using the decryption key, the software application 130 can decrypt the encrypted secret 102 to access the protected computing resources 114 using the secret 102. In some examples, the software application 130 may executed by the computing device 110.

Once the first encrypted secret 103*a* is stored in the physical server 106, the computing device 110 can modify a configuration 132 of the software application 130. By modifying the configuration 132, the software application 130 can access the first filesystem 122*a* of the physical server 106 to obtain the first encrypted secret 103*a* instead of retrieving the secret 102 from the cloud environment 104. The configuration 132 of the software application 130 may be defined by the source code of the software application 130. In such instances, modifying the configuration 132 of the software application 130 may involve modifying the source code of the software application 130 to retrieve the first encrypted secret 103*a* from the first filesystem 122*a*. Additionally or alternatively, the computing device 110 may route network traffic away from the cloud environment 104 to instead access the first encrypted secret 103*a* through the physical server 106.

In some examples, once the first encrypted secret 103*a* is stored in the first filesystem 122*a*, the computing device 110 may perform a test using the physical server 106 to executing a software application 130 that is configured to use the secret 102. Performing the test can give an indication of how the software application 130 is predicted to behave in a particular region of the cloud environment 104. Since the filesystems 122 of the physical server 106 are intended to replicate the cloud environment 104, the software application 130 can be tested without instantiating cloud instances. Based on the test, the computing device 110 can determine a predicted performance of executing the software application 130 in the cloud environment 104. For example, the computing device 110 may determine how the software application 130 performs for permission and access operations involving the first encrypted secret 103*a*.

In some examples, the computing device 110 may receive a secret and determine that the secret is unreadable. For instance, the computing device 110 may receive an indication of the secret without the content of the secret. The computing device 110 can generate a notification that is to be sent to a user device indicating the error associated with the secret. A user can then provide input related to the secret via the user device indicating the content of the secret. In this way, the computing device 110 can accurately replicate each secret in the cloud environment 104 on the physical server 106.

While FIG. 1 depicts a specific arrangement of components, other examples can include more components, fewer components, different components, or a different arrangement of the components shown in FIG. 1. For instance, in other examples, the computing device 110 may be coupled to two or more cloud environments. Each cloud environment may be provided by a different cloud provider and may have their own geographic regions with corresponding cryptographic requirements. As such, embodiments can provide techniques for migrating secrets from multiple cloud environments and encrypting the secrets for storage on a local system according to cryptographic and security level requirements. Additionally, any component or combination of components depicted in FIG. 1 can be used to implement the process(es) described herein.

Figure 2:
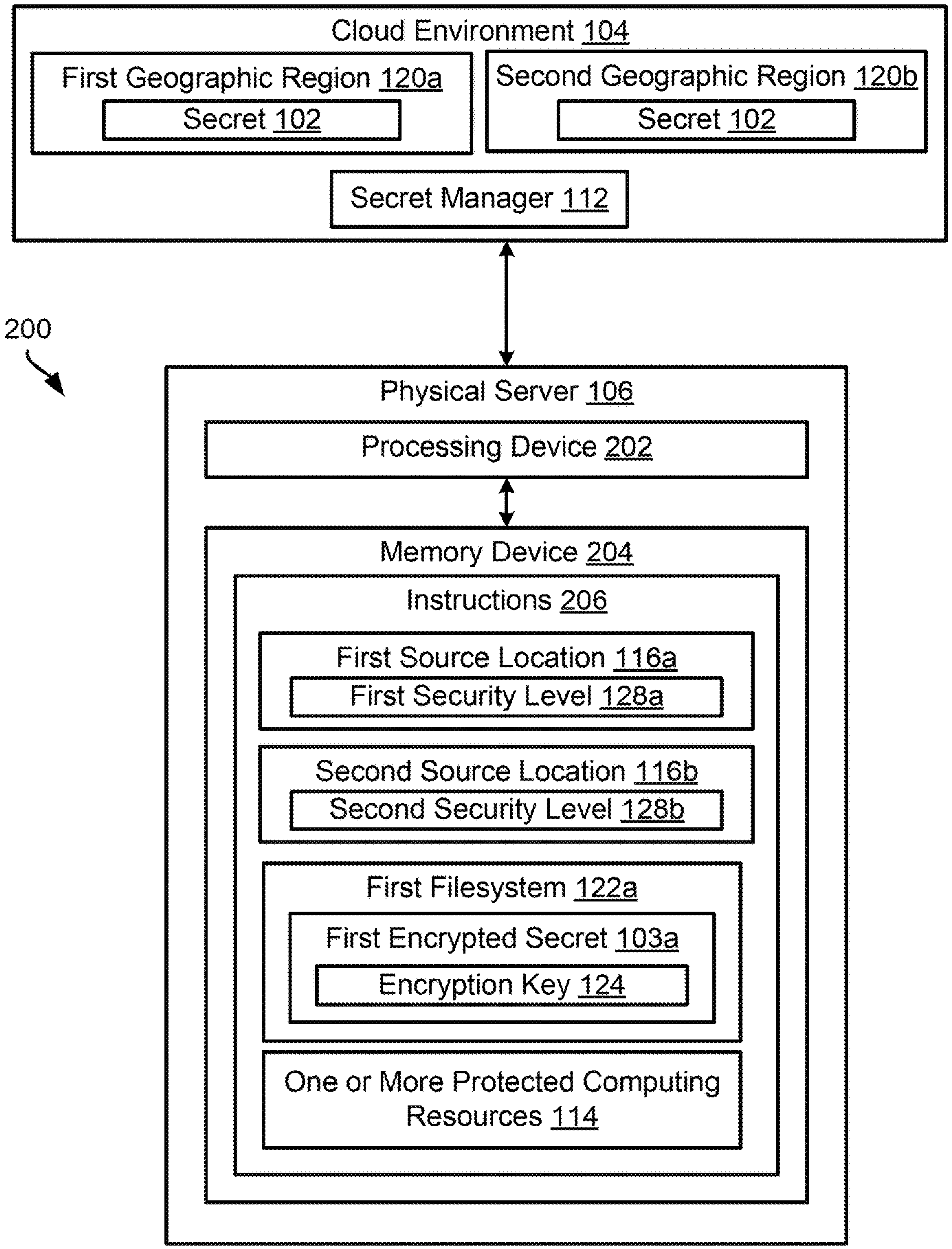
FIG. 2 is a block diagram of another example of a computing environment for migrating a replicated secret from a cloud environment to a local system according to one example of the present disclosure.

FIG. 2 is a block diagram of another example of a computing environment for migrating a replicated secret from a cloud environment 104 to a local system according to one example of the present disclosure. The computing environment 200 can include a physical server 106 containing a processing device 202 communicatively coupled to a memory device 204. The physical server 106 can be communicatively coupled to the cloud environment 104 to migrate a secret 102 from the cloud environment 104 to the physical server 106. Migrating the secret 102 can involve removing the secret 102 from the cloud environment 104 once the secret 102 is stored in the physical server 106.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processing device 202 can migrate the secret 102 stored in the cloud environment 104 to the physical server 106 such that an encrypted secret corresponding to the secret 102 is stored in a first filesystem 122*a* of the physical server 106. The processing device 202 can receive, from a secret manager 112 associated with the cloud environment 104, the secret 102 stored in a first geographic region 120*a* and a second geographic region 120*b* of the cloud environment 104. The processing device 202 can determine a first security level 128*a* associated with a first source location 116*a* of the secret 102 and a second security level 128*b* associated with a second source location 116*b* of the secret 102. The first source location 116*a* can be associated with the first geographic region 120*a* and the second source location 116*b* can be associated with the second geographic region 120*b*. The processing device 202 can encrypt the secret 102 using a first encryption key 124 associated with the first security level 128*a* to generate a first encrypted secret 103*a*. The processing device 202 can determine that a first filesystem 122*a* in the physical server 106 corresponds to the first source location 116*a* of the secret 102. The processing device 202 can store the first encrypted secret 103*a* in the first filesystem 122*a* of the physical server 106. The first encrypted secret 103*a* can be usable to control access of one or more protected computing resources 114. In some examples, the processing device 202 can identify a software application 130 that uses the secret 102, and thus the first encrypted secret 103*a*, to access the protected computing resources 114. For example, the secret 102 can be used to activate authority (e.g., administrative privileges, etc.) to access protected services.

Figure 3:
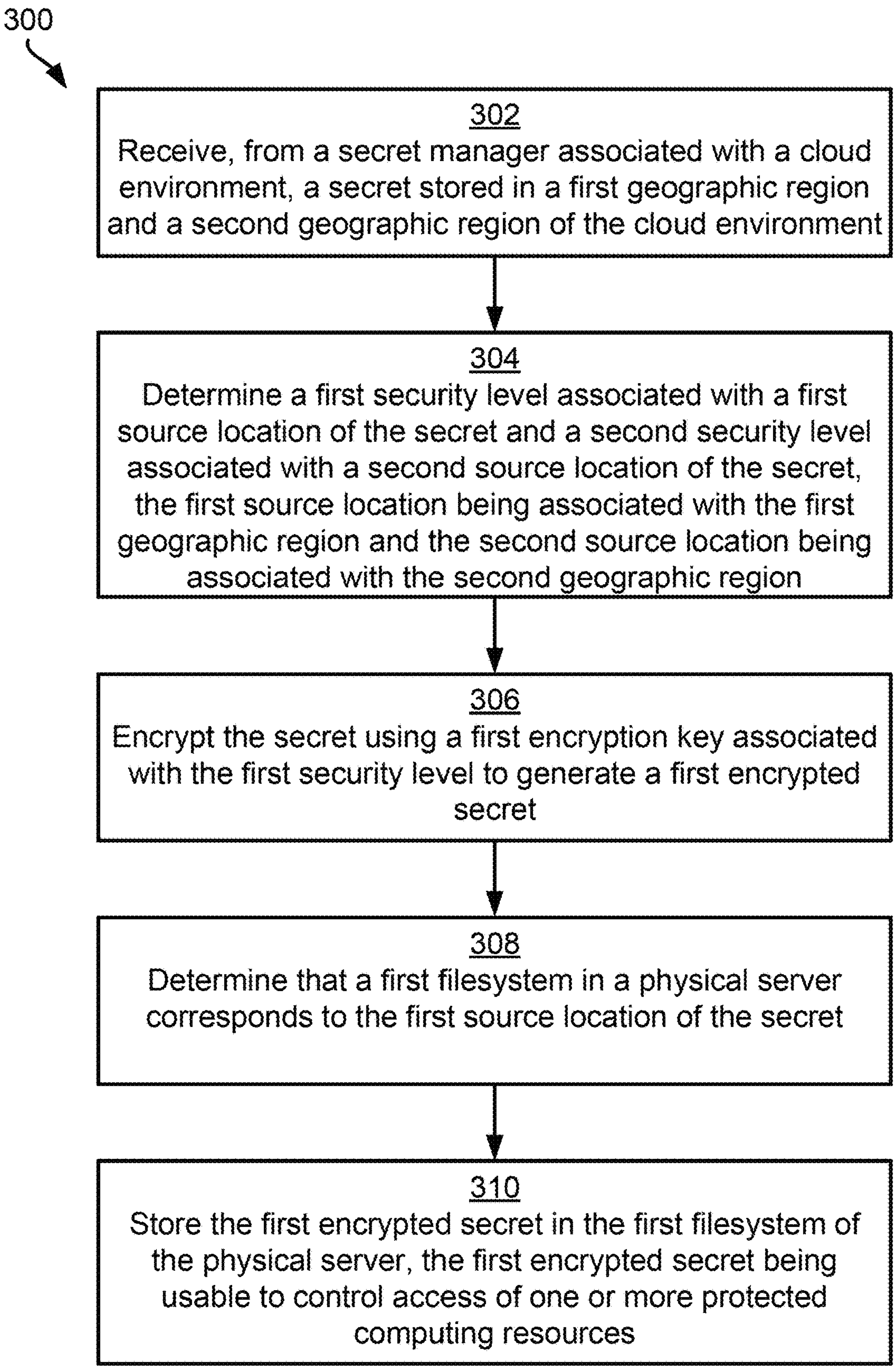
FIG. 3 is a flowchart of a process for migrating replicated secrets from a cloud environment to a local system according to one example of the present disclosure.

FIG. 3 is a flowchart of a process 300 for migrating replicated secrets from a cloud environment 104 to a local system according to one example of the present disclosure. The local system can be an on-premise computing system with a physical server 106 to store the secrets. In some examples, the processing device 202 can perform one or more of the steps shown in FIG. 3. In other examples, the processing device 202 can implement more steps, fewer steps, different steps, or a different order of the steps depicted in FIG. 3. The steps of FIG. 3 are described below with reference to components discussed above in FIGS. 1-2.

In block 302, the processing device 202 can receive, from a secret manager 112 associated with a cloud environment 104, a secret 102 stored in a first geographic region 120*a* and a second geographic region 120*b* of the cloud environment 104. The secret 102 can be digital authentication credentials (e.g., passwords, tokens, certificates, etc.) used to control access to one or more protected computing resources. The processing device 202 may receive the secret 102 as plain text or as an encrypted secret.

In block 304, the processing device 202 can determine a first security level 128*a* associated with a first source location 116*a* of the secret 102 and a second security level 128*b* associated with a second source location 116*b* of the secret 102. The first source location 116*a* can be associated with the first geographic region 120*a* and the second source location 116*b* can be associated with the second geographic region 120*b*. So, the first geographic region 120*a* can be associated with the first security level 128*a* and the second geographic region 120*b* can be associated with the second security level 128*b*. The security levels may be based on governmental or other data privacy regulations for the geographic regions. The first security level 128*a* and the second security level 128*b* may be the same or different.

In block 306, the processing device 202 can encrypt the secret 102 using a first encryption key 124 associated with the first security level 128*a* to generate a first encrypted secret 103*a*. The first encryption key 124 can be a cryptographic algorithm that meets the first security level 128*a*. The first encrypted secret 103*a* is associated with the secret 102 in the first geographic region 120*a*. The first encryption key 124 may also be used to generate a second encrypted secret 103*b* for the secret 102 in the second geographic region 120*b*. Or, a second encryption key associated with the second security level 128*b* may be used to generate the second encrypted secret 103*b* in association with the secret 102 in the second geographic region 120*b*.

In block 308, the processing device 202 can determine that a first filesystem 122*a* in the physical server 106 corresponds to the first source location 116*a* of the secret 102. The processing device 202 can identify a first location identifier 118*a* of the first filesystem 122*a* that maps to the first source location 116*a*. If the first filesystem 122*a* is not present in the physical server 106, the processing device 202 can generate the first filesystem 122*a* associated with the first source location 116*a*.

In block 310, the processing device 202 can store the first encrypted secret 103*a* in the first filesystem 122*a* of the physical server 106. In addition, the processing device 202 can store the second encrypted secret 103*b* or a reference 126 to the first encrypted secret 103*a* in a second filesystem 122*b* associated with the second source location 116*b*. Using filesystems on the physical server 106 to store encrypted secrets, the topology of the cloud ecosystem can be faithfully represented allowing for the logical and physical separation of services and data that are replicated in an on-premise migration. Combining the regions into logical blocks provides more deployment opportunities for infrastructure layout while ensuring the cryptographic requirements are honored.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
- a processing device; and
- a memory device including instructions that are executable by the processing device for causing the processing device to perform operations comprising:
  - receiving, from a secret manager associated with a cloud environment, a secret stored in a first geographic region and a second geographic region of the cloud environment;
  - determining a first security level associated with a first source location of the secret and a second security level associated with a second source location of the secret, the first source location being associated with the first geographic region and the second source location being associated with the second geographic region;
  - encrypting the secret using a first encryption key associated with the first security level to generate a first encrypted secret;
  - determining that a first filesystem in a physical server corresponds to the first source location of the secret; and
  - storing the first encrypted secret in the first filesystem of the physical server, the first encrypted secret being used to control access of one or more protected computing resources.

2. The system of claim 1, wherein the operations further comprise:
- encrypting the secret using a second encryption key associated with the second security level to generate a second encrypted secret;
- determining that a second filesystem in the physical server corresponds to the second source location of the secret; and
- storing the second encrypted secret in the second filesystem of the physical server.

3. The system of claim 1, wherein the operations further comprise:
- prior to encrypting the secret, determining that the second security level is lower than the first security level; and
- encrypting the secret using the first encryption key associated with the first security level to generate the first encrypted secret in response to the second security level being lower than the first security level.

4. The system of claim 1, wherein the operations further comprise:
- determining that a second filesystem in the physical server corresponds to the second source location of the secret; and
- storing, in the second filesystem, a reference to the first encrypted secret in the first filesystem.

5. The system of claim 1, wherein the operations further comprise, subsequent to storing the first encrypted secret in the first filesystem:
- performing, using the physical server, a test for executing a software application configured to use the secret; and
- determining, based on the test, a predicted performance of executing the software application in the cloud environment.

6. The system of claim 1, wherein the operations further comprise, subsequent to storing the first encrypted secret in the first filesystem:

identifying a software application configured to use the secret to access the one or more protected computing resources; and modifying a configuration of the software application to use the first encrypted secret stored in the first filesystem of the physical server.

7. The system of claim 1, wherein the operations further comprise, subsequent to identifying the first source location of the secret:

determining that the physical server lacks the first filesystem corresponding to the first source location of the secret; and generating the first filesystem in the physical server.

8. A method comprising:

receiving, from a secret manager associated with a cloud environment, a secret stored in a first geographic region and a second geographic region of the cloud environment;

determining a first security level associated with a first source location of the secret and a second security level associated with a second source location of the secret, the first source location being associated with the first geographic region and the second source location being associated with the second geographic region;

encrypting the secret using a first encryption key associated with the first security level to generate a first encrypted secret;

determining that a first filesystem in a physical server corresponds to the first source location of the secret; and storing the first encrypted secret in the first filesystem of the physical server, the first encrypted secret being used to control access of one or more protected computing resources.

9. The method of claim 8, further comprising:

encrypting the secret using a second encryption key associated with the second security level to generate a second encrypted secret;

determining that a second filesystem in the physical server corresponds to the second source location of the secret; and storing the second encrypted secret in the second filesystem of the physical server.

10. The method of claim 8, further comprising:

prior to encrypting the secret, determining that the second security level is lower than the first security level; and encrypting the secret using the first encryption key associated with the first security level to generate the first encrypted secret in response to the second security level being lower than the first security level.

11. The method of claim 8, further comprising:

determining that a second filesystem in the physical server corresponds to the second source location of the secret; and storing, in the second filesystem, a reference to the first encrypted secret in the first filesystem.

12. The method of claim 8, further comprising, subsequent to storing the first encrypted secret in the first filesystem:

performing, using the physical server, a test for executing a software application configured to use the secret; and determining, based on the test, a predicted performance of executing the software application in the cloud environment.

13. The method of claim 8, further comprising, subsequent to storing the first encrypted secret in the first filesystem:

identifying a software application configured to use the secret to access the one or more protected computing resources; and modifying a configuration of the software application to use the first encrypted secret stored in the first filesystem of the physical server.

14. The method of claim 8, further comprising, subsequent to identifying the first source location of the secret:

determining that the physical server lacks the first filesystem corresponding to the first source location of the secret; and generating the first filesystem in the physical server.

15. A non-transitory computer-readable medium comprising program code executable by a processing device for causing the processing device to perform operations comprising:

receiving, from a secret manager associated with a cloud environment, a secret stored in a first geographic region and a second geographic region of the cloud environment;

determining a first security level associated with a first source location of the secret and a second security level associated with a second source location of the secret, the first source location being associated with the first geographic region and the second source location being associated with the second geographic region;

encrypting the secret using a first encryption key associated with the first security level to generate a first encrypted secret;

determining that a first filesystem in a physical server corresponds to the first source location of the secret; and storing the first encrypted secret in the first filesystem of the physical server, the first encrypted secret being used to control access of one or more protected computing resources.

16. The non-transitory computer-readable medium of claim 15, wherein the operations further comprise:

encrypting the secret using a second encryption key associated with the second security level to generate a second encrypted secret;

determining that a second filesystem in the physical server corresponds to the second source location of the secret; and storing the second encrypted secret in the second filesystem of the physical server.

17. The non-transitory computer-readable medium of claim 15, wherein the operations further comprise:

prior to encrypting the secret, determining that the second security level is lower than the first security level; and encrypting the secret using the first encryption key associated with the first security level to generate the first encrypted secret in response to the second security level being lower than the first security level.

18. The non-transitory computer-readable medium of claim 15, wherein the operations further comprise:

determining that a second filesystem in the physical server corresponds to the second source location of the secret; and storing, in the second filesystem, a reference to the first encrypted secret in the first filesystem.

19. The non-transitory computer-readable medium of claim 15, wherein the operations further comprise, subsequent to storing the first encrypted secret in the first filesystem:

performing, using the physical server, a test for executing a software application configured to use the secret; and determining, based on the test, a predicted performance of executing the software application in the cloud environment.

20. The non-transitory computer-readable medium of claim 15, wherein the operations further comprise, subsequent to storing the first encrypted secret in the first filesystem:

identifying a software application configured to use the secret to access the one or more protected computing resources; and modifying a configuration of the software application to use the first encrypted secret stored in the first filesystem of the physical server.

* * * * *